United States Patent
Mack et al.

[15] 3,652,409
[45] Mar. 28, 1972

[54] BEARING COMPOSITIONS

[72] Inventors: Edward J. Mack; Harris T. Childs, Jr., both of Bristol, R.I.

[73] Assignee: Dixon Corporation, Bristol, R.I.

[22] Filed: Sept. 12, 1968

[21] Appl. No.: 759,527

Related U.S. Application Data

[63] Continuation-in-part of Ser. No. 669,674, Sept. 22, 1967, abandoned.

[52] U.S. Cl. ...................................................252/12
[51] Int. Cl. ...........................................C10m 5/20
[58] Field of Search ...................252/12, 12.2, 12.4, 12.6

[56] References Cited

UNITED STATES PATENTS

| | | | |
|---|---|---|---|
| R26,088 | 9/1966 | Rulon-Miller et al. | 252/12 |
| 2,400,091 | 5/1946 | Alfthan | 252/12 |
| 2,975,128 | 3/1961 | Stott | 252/12 |
| 3,013,967 | 12/1961 | Rulon-Miller et al. | 252/12 |
| 3,126,339 | 3/1964 | Stott | 252/12 |
| 3,344,064 | 9/1967 | Brady et al. | 252/12.2 |
| 3,356,759 | 12/1967 | Gerow | 252/12 |
| 3,453,208 | 7/1969 | Gallagher et al. | 252/12 |

*Primary Examiner*—Daniel E. Wyman
*Assistant Examiner*—I. Vaughn
*Attorney*—Morgan, Finnegan, Durham & Pine

[57] ABSTRACT

In accordance with this invention there is obtained a polyimide-polytetrafluoroethylene resin composition which can be fabricated into bearings having unusually low frictional resistance.

23 Claims, No Drawings

BEARING COMPOSITIONS

This application is a continuation-in-part of our copending application Ser. No. 669,674, filed Sept. 22, 1967, and now abandoned.

BACKGROUND OF THE INVENTION

Fluorocarbon polymers are well-known materials. Materials such as polytetrafluoroethylene resins, hereinafter referred to as TFE resins, have achieved wide-spread use for high temperature, dielectric and chemical resistance applications. There has been some utilization of TFE resins for bearing purposes, but such applications have generally been out of necessity rather than desire. Pure polytetrafluoroethylene, when used as a bearing surface or as a rod moving against a bearing surface, appear to wear too rapidly to make their utilization economically justifiable.

Consequently, in the past TFE resins have been provided with filler materials to enhance the wear properties and facilitate the use of TFE as bearing material. Illustrative of filler materials are silicates, such as mica, talc, aluminum silicates and glass. Moreover, the use of silicates in combination with materials such as molybdenum, silver and other metals to reinforce TFE has also been tried with resultant improvement. U.S. Pat. Re. No. 26,088 (Sept. 20, 1966) discloses a variety of filler materials to improve the wear characteristics of Teflon.

Polyimide resins in general have been known for some time although more recently a number of different forms of polyimide resins have been developed. For the most part, polyimide resins can be molded but cannot be used with any degree of success as bearing surfaces. When polyimide resins are used as bearing materials, they offer substantially no protection against excessive scoring and deformation. The polyimides are, however, useful in electrical applications and for other purposes.

THE INVENTION

In accordance with this invention, a composition containing TFE resin and polyimide resin can be employed to produce a molded shape having exceptional resistance to frictional wear and hence which is satisfactory as a dry bearing material even against soft metals such as brass. This unusual synergistic interaction between the TFE resin and the polyimide resin is all the more surprising because neither component alone, whether TFE resin or polyimide resin, has satisfactory bearing resistance particularly when moving against a soft metal such as brass.

Thus, this invention also comprises a method of increasing the abrasion resistance of TFE resins.

The polytetrafluoroethylene applicable for use in this invention can initially be in any form, e.g., resin powder, wax, fiber, etc. Telomers of polytetrafluoroethylene are also included within the scope of applicable polytetrafluoroethylene. Polytetrafluoroethylene is obtained by conventional means, for example, by polymerization of tetrafluoroethylene under pressure using free-radical catalysts such as peroxides or persulfates. Representative methods of preparing polytetrafluoroethylene resins are disclosed in U.S. Pat. No. 2,393,967. Polyimide resins are generally prepared by reaction of a primary diamine with an aromatic tetracarboxylic acid, anhydride or ester, to form a linear polyamide-acid which, upon subsequent heating, is converted to the polyimide. The sequence of reactions can be understood more fully by reference to the reaction between pyromellitic acid and tetramethylene diamine. The stages of reaction are as follows:

Stage I—Formation of polyamide-acid

I

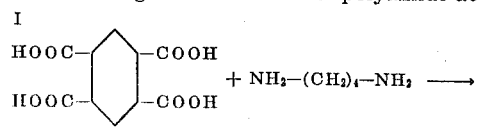
+ $NH_2-(CH_2)_4-NH_2 \longrightarrow$

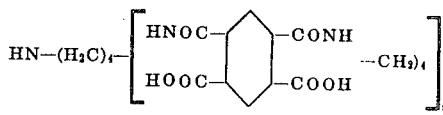

Stage II—Conversion of polyamide-acid to polyimide

II $I \longrightarrow$ 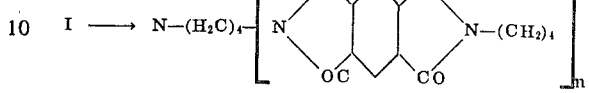

In general, the polyimides useful in this invention will have the structural formula

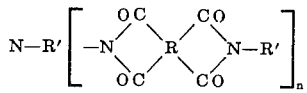

in which R is an aromatic ring-containing radical having at least one benzene ring. Preferred R groups include the following:

Phenyl

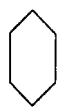

Naphthyl

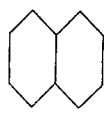

Diphenyl

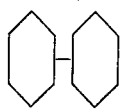

or

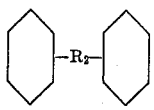

where $R_2$ can be $-\overset{\overset{\displaystyle O}{\|}}{C}-, -S-, -O-, -SO_2-, -R_3-, -O-R_3-,$ and $-O-R_3-O-$ where $R_3$ is a saturated aliphatic hydrocarbon radical having from one to about six carbon atoms such as $-CH_2-$ and $CH_3-\overset{|}{\underset{|}{C}H}-CH_3$ In general, R can be any tetravalent aromatic radical having benzenoid unsaturation. The four carbonyl groups are preferably attached directly to separate carbon atoms of aromatic rings. The diamine component of the polyimides can be any diamine known to the art as being useful in the preparation of polyimides. It is well-known that the ultimate properties to be desired influence the nature of the amine that is employed. In general, any poly primary amine is useful to some extent. The amine can be aromatic or aliphatic. Among the aliphatic amines, the diaminoalkanes having at least four carbon atoms in the chain separating amino groups are preferred with the alkane portion having a total of four to about twelve carbon atoms, as, for example, tetramethylenediamine and hexamethylenediamine. Aromatic diamines can also be employed including the phenylene diamines such as metaphenylenediamine, various naphthylenediamines and primary amines having the formula

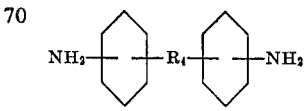

in which $R_4$ can be

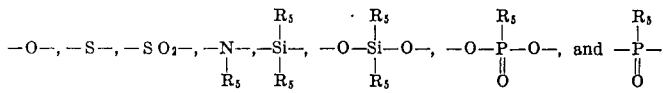

in which each $R_5$ can be lower alkyl of from one to six carbon atoms or aryl having about six carbon atoms.

The method of polymerizing to form the polyamide-acids is well-known and does not form a part of this invention. In general, the desired tetracarboxylic acid or anhydride or ester is reacted with a poly primary diamine in a suitable solvent for the requisite time and desired temperature to form the polyamide-acid. The polyamide-acid will generally be soluble in the solvent employed or, if not, will be soluble in one or more other solvents.

The molecular weight of the polyamide-acid and consequently of the final polyimide can vary sharply depending upon reaction conditions and the ultimate properties desired. The preferred polyamide-acids will show a Brookfield viscosity ranging from about 100 to 5,000 centipoises as a 15 percent by weight solution in 1:1 dimethylacetamide and N-methylpyrrolidone at 25° C.

The polyimide can be formed from the polyamide-acid by applying heat to the polyamide-acid, for example, by heating the solution of polyamide-acid in a solvent or by heating the dry solid polyamide-acid. A period of time of at least about 5 to about 30 minutes at a temperature of at least about 400° F. and preferably between about 600° and 700° F. is generally sufficient for conversion of the polyamide-acid to the polyimide. Longer times are, of course, necessary at lower reaction temperatures and also for increased molecular weight and, if desired, for increased cross-linking.

Other methods are also sometimes employed for the conversion of polyamide-acid to polyimide, as, for example, the chemical treatment with a dehydrating agent either alone or in combination with a tertiary amine catalyst. Further details on methods of preparing different polyimide and polyamide-acid resins can be obtained from the literature including, for example, U.S. Pat. Nos. 3,190,856; 3,105,775; 3,179,635; 2,421,024; 3,037,966; 2,710,853; 3,179,634; 2,731,447; and 2,712,543.

There are several methods which can be used to form useful compositions of TFE resins and polyimide. In one method, a polyimide resin can be caused to be finely divided either directly during manufacture or by pulverization to a particle size of between about 10 and 80 microns, preferably between about 70 and 80 microns, and thereafter mixed with a suitable TFE resin also in finely divided form and having a particle size of between about 5 and 50 microns, preferably 25 and 40.

A suitable blending technique should be employed to insure homogeneity. For example, the particulate TFE resin and particulate polyimide resin can be mixed in dry form at room temperature and tumbled to get a fairly uniform mixture. Thereafter, it is generally desirable to add the mixture to a pulverizing machine such as a hammer mill to grind and further mix the resinous components to insure homogeneity. In practice, this has been found desirable to pass the TFE-polyimide mixture through a hammer mill pulverizer having an ⅛-inch screen (holes are ⅛ inch diameter). Ideal results are achieved when the mixture is passed through the hammer mill 4 times.

An alternate blending method is to add the polyimide resin to an aqueous suspension of TFE resin with agitation to cause the formation of a homogeneous dispersion. Then the precipitation of solids can be caused by the addition of a nonaqueous solvent such as acetone. The mixture thus obtained can be filtered, washed and dried to provide a homogeneous material suitable for molding. Of course, the polyimide resin can be dispersed and the particulate TFE resin added thereto in the converse of the foregoing procedure.

The mixture of polyimide and TFE resins, however obtained, is a very useful product and has exceptional wear characteristics when molded to form a bearing surface. This utility is greater than the utility of either polyimide or TFE resin alone. However, the mixture must contain less than 50 percent by weight of polyimide resin and conversely more than 50 percent by weight of TFE resin to insure that the composition has a TFE continuous phase or matrix. In practice it has been found that a mixture of 80 percent TFE resin and 20 percent polyimide provides the most desirable composition material for use in bearings. Additional filters can also be added during the blending stage to add whatever properties such fillers normally would be expected to impart to resin compositions. Generally, not more than about 15 percent by weight of the mixture should be composed of such other fillers which can include graphite, glass fibers, metallic oxides, mica, talc, bronze, copper, aluminum, silver, molybdenum, Fiberfrax, and the like.

By careful control of proportions, relative particle sizes, degree of homogeneity and fabrication conditions, compositions of this invention can be prepared which will afford optimum bearing characteristics.

In this invention by which TFE resins are rendered more abrasion-resistant, TFE resins are improved through the incorporation of from about 5 to 40 percent by weight, preferably at least 10 percent and ideally 20 percent of polyimide resins while maintaining the polytetrafluoroethylene as the continuous phase or matrix. The TFE and polyimide resins can be blended directly in dry form or the polyimide resin powder can be mixed with an aqueous dispersion of TFE resin particles. The particle sizes and relative bulk volumes should be such as to maintain the TFE as the continuous phase or matrix, e.g., by using relatively smaller sized TFE resin particles.

The compositions of this invention can be used for forming molded objects of varying types. The primary utility of the compositions would appear to be as bearings and as bearing surfaces. However, other useful molded products can also be made of these materials. The method of molding should be apparent to those skilled in the art of molding polymeric materials. A representative technique for preparing bearings is the following:

A steel mold approximately 12 inches long is used to preform a slug or a small billet that is ultimately formed into a bearing. A 1 inch long end plug is contained at the bottom of the mold. The mold is filled with the powdered composition of this invention. A 1-inch-long end plug is loosely placed on the top and a pusher rod is installed to facilitate pressurization of the billet. The mold is then pressurized to about 6,000 p.s.i. to perform the billet. Subsequently, the mold is placed into an oven which has been preheated to 700° F. The mold is kept in the oven for 3 hours during which time the oven is maintained at the 700° F. temperature. The mold is then removed from the oven and a pressure 3,000 p.s.i. is applied while the mold and billet are allowed to cool. The molded piece is then cut, drilled and bored to size.

Further details on the processes and products of this invention can be obtained from the following examples, which represent the best mode of the invention known to the inventors:

EXAMPLES 1 to 4

In each of the following examples the starting material used to produce the polyimide was a polyamide-acid commercially obtainable in the form of a polyamide-acid "varnish" composition. The polyamide acid is prepared by the reaction of benzophenone tetracarboxylic acid anhydride with 4,4'-oxydianiline in a solvent of N-methylprrolidone in accordance with the procedure of U.S. Pat. No. 3,190,856.

The polyimide resin was prepared from the commercial varnish by pouring the material into a vacuum reactor, applying 28 inches 1/3 l vacuum and then allowing air to flush into the reactor to achieve 18 inches of vacuum and maintaining a level of 18 inches of vacuum. The reactor was heated for approximately 16 hours at 225°–250° F. followed by passing the material through a Cumberland grinder using a ⅛-inch screen. The material was then heated under 15 inches of vacuum at 225°–250° F. for an additional 8 hours and ground in four passes through a "Mikro-pulverizer" with a "-inch screen. Thereafter, the material was dried in air at 425° F. for about 1 hour to remove all solvent. After solvent removal was complete, the temperature was raised to 675° F. for 15 minutes to permit conversion of the polyamide-acid to the polyimide form. The polyimide product was then passed through the "Mikro-pulverizer" with a 1/32-inch screen.

A series of compositions were made up having varying amounts of TFE resin and polyimide resin. In forming blends of TFE resin and polyimide resin the selective quantity of polyimide resin as prepared as above and the selective quantity of TFE resin, in each case a commercial fine-grind TFE powder having a particle size of about 30 microns, were mixed together at room temperature and tumbled to get a fairly uniform mixture. Thereafter, the mixture was pulverized in a pulverizing machine to grind and further mix the TFE and polyimide resins. The particular blends prepared are set forth in Table I below.

Bearings and other test shapes were then formed of the powder by pressure molding techniques in which an air operated ram forces a charge of powder down into a die or mold. Various physical tests were conducted on the molded object in accordance with the procedures set forth in Table I and the results are recorded in Table I.

The coefficient of friction value recorded in Table I was determined by molding the particular composition into test sleeves measuring ½ inch I.D. × 11/16 O.D. × ½ inch long and press fitting the sleeves into aluminum housings having a 2 inch O.D., thereby forming a test bearing with the bearing surface being of a composition specified in Table I. The test bearing was then placed on a ½-inch-diameter shaft driven by a variable speed motor. This shaft is adjusted to a maximum indicator run out of 0.001 inch. The bearing is loaded by placing a weight connected to a wire around the groove machined on the circumference of the aluminum housing. Frictional force is then measured by a Brabender dynomometer. In the standard tests, samples are run for one hour at a pressure velocity value of 2,000 using a load of approximately 100 p.s.i. at a shaft surface speed of approximately 20 feet per minute. The initial clearance on the bearing is set to between 0.003 and 0.006. The coefficient of friction is then calculated following completion of the test. Of course, the lower the coefficient of friction the more valuable the bearing.

In determining the wear factor K, set out in Table I, the same bearing, housing and shaft are used as in the friction test. A PV of 10,000 is used at a load of approximately 45 p.s.i., and a shaft surface speed of 220 feet per minute is employed. The shaft material is made out of drill rod of a hardness of from B85 to 90 Rockwell. In calculating the wear factor K, the weight loss after running for a given period of time is determined when used to compute radial wear by using the formula $R = W \, d \times A$. $W$ is the weight loss and $A$ is projected area and $d$ is density. $K$ is then calculated by means of the formula $K = R$ PVT where $P$ is pressure in p.s.i. on the projected area, in this case ¼-square inch, $V$ is speed in feet per minute, and $T$ is time in hours. Wear tests are run for at least 150 hours.

The test results recorded in Table I show surprising benefits obtained by means of this invention. Thus, bearing surfaces made of pure polyimide (Example 1) or pure TFE resin (Example 4) could not be operated for the time necessary for the test. The pure polyimide bearing surface, Example 1, failed in less than 5 minutes of operation, resulting in severe scoring of the test drum due to the absence of a satisfactory bearing surface. Use of the pure TFE bearing surface was discontinued after 15 minutes because it, too, was at the point of failure and any further use would have resulted in scoring. No wear factor could even be calculated for the polyimide resin bearing whereas a wear factor in excess of 50,000 could roughly be estimated for the TFE resin bearing. However, when TFE resin provided with varying amounts of polyimide were employed under precisely the same conditions, much lower wear factors were obtained.

Similarly, an unexpectedly low coefficient of friction was obtained for composition of TFE with polyimide.

TABLE I

| Example | 1 | 2 | 3 | 4 |
|---|---|---|---|---|
| Polyimide resin, parts by weight | 100 | 20 | 10 | 0 |
| TFE Resin, parts by weight | 0 | 80 | 90 | 100 |
| Specific gravity (ASTM D792-60T) | 1.40 | 1.89 | 2.10 | 2.16 |
| Tensile strength, p.s.i. (ASTM 1708-59T) | 11,600 | 2,470 | ........ | 4,000 |
| Elongation, percent (ASTM 1708-59T) | 3.0 | 200 | ........ | 300 |
| Deformation under load, percent (ASTM D621-59, Mod.) at 2,000 p.s.i. after 24 hrs. at R.T. coefficient of friction | 0.4 | | | |
| | .52 | 0.19 | .24 | (¹) |
| Wear factor, K, after 150 hours PV= 10,000 at R.T. | (²) | 30 | 50 | ³ 50,000 |

¹ Excessive flaking.
² Failed within 5 minutes.
³ Discontinued after 15 minutes.

EXAMPLES 5 to 13

To illustrate the utility of the mixtures of this invention as bearing surfaces for use in bearing relation with soft metals such as brass, various TFE compositions with polyimide resin were prepared as in Examples 1 through 4, the polyimide resin being the same as used therein. Where fillers are added, they were added simultaneously with the dry blending of the TFE and polyimide resins. Proportions of ingredients are set forth in Table II. In calculating the wear factor set forth in Table II, the shaft material employed in the tests in determining the coefficient of friction and the wear factor was brass and in calculating the wear factor a PV of 5,000 was used at a load of approximately 23 p.s.i. with the shaft surface speed being 220 feet per minute. The results obtained are recorded in Table II.

TABLE II

| | Parts by weight | | | On brass shaft | | |
|---|---|---|---|---|---|---|
| Example | TFE resin | Polyimide resin | Filler, if any | Coefficient of friction | Wear factor | Condition of shaft after test |
| 5 | 100 | 0 | | Flaked too badly for use. K>50,000 | | |
| 6 | 90 | 10 | | | 35 | Good. |
| 7 | 90 | ¹ 10 | | | 1 | Do. |
| 8 | 80 | 20 | | 0.18 | 2 | Do. |
| 9 | 60 | 40 | | 0.26 | 20 | Do. |
| 10 | 0 | 100 | | Failed within 5 minutes ² | | |
| 11 | 85 | 0 | Graphite, 15 parts | 0.20 | 200 | Good. |
| 12 | 75 | 10 | ...do... | 0.25 | 60 | Do. |
| 13 | 75 | 0 | Glass fibers, 25 parts | Failed within 5 minutes ² | | |

¹ Contains 15% by weight of a TFE wax composition.
² With excessive scoring of shaft.

Again, from Table II, it is immediately apparent that a composition of TFE with polyimide resin yields results considerably different in kind than the results obtained from either TFE or polyimide resins alone as bearings. Thus, TFE resin bearing surfaces flake too badly for use and pure polyimide resin failed immediately when put into service.

But in contrast, a composition having TFE as the continuous phase with polyimide incorporated therein gave good results. The polyimide obviously serves as something more than a filler for the TFE resin since the mere addition of a filler, as in the case of glass fiber, resulted in prompt failure of the bearing surface.

EXAMPLES 14 to 18

Examples 14 to 18 illustrated the wear proprieties of TFE having polyimide incorporated therein as compared with standard glass and graphite filled TFE formulations. As can be seen from Table III, three TFE formulations were tested for wear. The three formulations were respectively, TFE having 20 percent polyimide incorporated therein, TFE with a 25 percent glass filler and TFE with a 15 percent graphite filler. Each of the test specimens were sleeves which were formed of ¾-inch-diameter rods preformed at 8,000 p.s.i. and sintered using a standard SPI cycle. The three formulations were arranged on shafts made respectively of brass, aluminum, aluminum (Martin Hard Coat), 316 stainless steel and drill rod. In each case the PV factor was raised from a minimum to a maximum and K factors (wear factors) and shaft conditions were examined for various PV levels. The examples, as seen in Table III show the results of the examples indicating the superiority of Teflon having polyimide incorporated therein over glass or graphite filled TFE.

ing materials for use against soft metals such as brass. It can be readily understood that in many instances the use of a lubricated bearing surface is not desirable. However, until the present time there was very little alternative to the use of lubricated bearings for surface in bearing contact with soft metals.

Similar satisfactory bearing compositions were obtained using mixtures of tetrafluoroethylene resin and the linear polymeric amide modified polyimides of U.S. Pat. No. 3,179,635 including the commercial product designated as Westinghouse AI-131 believed to be the product produced in accordance with Examples 1 and 2 of the said patent. Satisfactory results were also obtained with polyimide blends in which the polyimide was Monsanto RX-268 and Monsanto TS-6720 and Amoco AI-11 polyimide resins.

In addition to these specific polyimide resins, any of the polyimide resins known to the art including those described above can be employed since it appears to be not the nature of the total molecule but rather the presence of the imide groups that leads to the unexpected results obtained by means of this invention.

We claim:

1. A method of making a composition useful for making bearings comprising the steps of:

TABLE III

| Type of shaft | | PV | K | 20% polyimide shaft | Type of filler | | | |
|---|---|---|---|---|---|---|---|---|
| | | | | | 25% glass | | 15% graphite | |
| | | | | | K | Shaft | K | Shaft |
| Example 14 | Brass | 2,000 | | | | Failed* | | |
| | | 5,000 | | | | | 200 | OK |
| | | 10,000 | 3 | OK | | | | Failed* |
| | | 20,000 | 300 | Sl. scored | | | | |
| Example 15 | Aluminum | 2,000 | | | | Failed* | | |
| | | 5,000 | 8 | OK | | | 200 | OK |
| | | 10,000 | 180 | Sl. scored | | | | |
| | | 20,000 | | Failed* | | | | |
| Example 16 | Aluminum (Martin hard coat) | 10,000 | 7 | OK | 3 | OK | 130 | OK |
| | | 20,000 | 8 | OK | | Failed* | | |
| Example 17 | 316 S. S. | 10,000 | 7 | OK | 9 | OK | 180 | OK |
| | | 15,000 | | | | Failed* | | |
| | | 20,000 | 120 | Sl. scored | | | | |
| Example 18 | Drill rod | 10,000 | 30 | OK | 10 | OK | 60 | OK |
| | | 20,000 | 70 | OK | | Failed* | | |

*"Failed" means that the bearing bound and the shaft became badly scored. This usually occurred in less than 1 hour of test time.

EXAMPLES 19 and 20

To determine the effect of the particle size of the polyimide material incorporated in the TFE formulations tests were conducted using 100 mesh (149 micron) size polyimide particles and 200 mesh (74 micron) size particles in a TFE formulation having 20 percent polyimide incorporated therein. The TFE formulations were formed into sleeves made from ¾-inch rods which were preformed at 8,000 p.s.i. and sintered using the standard SPI cycle. The tests indicate that the wear factors of 20 percent polyimide TFE formulations are enhanced if the 200 mesh (74 micron) size particles are used. Table IV illustrates the result of the test.

TABLE IV

| Example | 19 | 20 |
|---|---|---|
| Av. Part Size | 100 mesh (149 microns) | 200 mesh (74 microns) |
| K-Factor | 30 | 5 |
| Cond. of Shaft | OK | OK |

The results of this invention yield excellent bearing compositions for soft metals such as brass. Until this discovery, the art had no satisfactory high temperature non-lubricated bearsuspending polytetrafluoroethylene resin in an aqueous solution;

adding polyimide resin to said aqueous suspension of polytetrafluoroethylene resin in a proportion wherein the polyimide resin is about 5 to 40 percent by weight of the composite polyimide and polytetrafluoroethylene mass, said polyimide having the structural formula

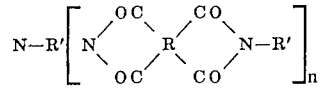

in which R is a tetravalent aromatic radical; R' is an organic radical derived from an organic poly primary amine and $n$ is a number taken to produce the desired molecular weight;

agitating the mixture to form a homogeneous dispersion; and precipitating the solids from said aqueous suspension by adding a nonaqueous solution.

2. A method as in claim 1 wherein the proportion of polyimide resin is 20 percent by weight of the composite polyimide and polytetrafluoroethylene mass.

3. A method as in claim 2 wherein the polytetrafluoroethylene resin suspended in the aqueous suspension has a particle size of between 5 and 50 microns; and the polyimide resin added to the aqueous suspension has a particle size of between 10 and 80 microns.

4. A method as in claim 3 wherein the nonaqueous solution added to precipitate the solid from said aqueous solution is acetone.

5. A method as in claim 3 including the further steps of:
filtering the precipitate of said aqueous suspension;
washing the precipitate; and
drying the precipitate.

6. A composition useful for making bearings comprising a continuous phase of a tetrafluoroethylene polymer having dispersed therein 5–40 percent by weight of a polyimide resin of the structural formula

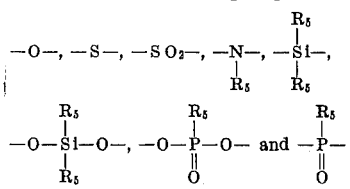

in which R is a tetravalent aromatic radical; R' is an organic radical derived from an organic poly primary amine and $n$ is a number taken to produce the desired molecular weight.

7. A composition as in claim 6 wherein R' is an aliphatic group containing from four to 12 carbon atoms.

8. A composition as in claim 6 wherein R' is an aromatic group.

9. A composition as in claim 8 wherein R' is a phenylene group.

10. A composition as in claim 8 wherein R' has the formula

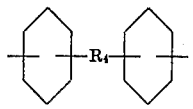

in which $R^4$ is selected from the group consisting of

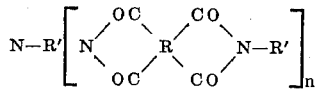

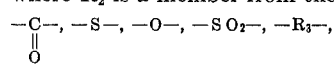

in which each $R^5$ group is a lower alkyl group or an aryl group having up to about six carbon atoms.

11. A composition as in claim 8 wherein R' is a naphthylene group.

12. A composition as in claim 6 in which R is an aromatic radical containing at least one benzene ring.

13. A composition as in claim 6 in which R is selected from the group consisting of phenyl, naphthyl, diphenyl and the group

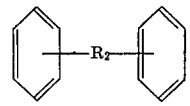

where $R_2$ is a member from the group consisting of $-\overset{\text{O}}{\underset{\|}{\text{C}}}-, -S-, -O-, -SO_2-, -R_3-,$ $-O-R_3-$, and $-O-R_3-O-$, and $R_3$ is a saturated aliphatic hydrocarbon having from one to about six carbon atoms.

14. A composition as in claim 8 in which R is selected from the group consisting of phenyl, naphthyl, diphenyl and the group

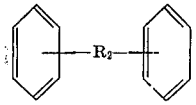

where $R_2$ is a member from the group consisting of $-\overset{\text{O}}{\underset{\|}{\text{C}}}-, -S-, -O-, -SO_2-, -R_3-,$ $-O-R_3-$, and $-O-R_3-O-$, and $R_3$ is a saturated aliphatic hydrocarbon having from one to about six carbon atoms.

15. A composition as in claim 9 in which R is selected from the group consisting of phenyl, naphthyl, diphenyl and the group

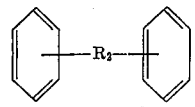

where $R_2$ is a member from the group consisting of $-\overset{\text{O}}{\underset{\|}{\text{C}}}-, -S-, -O-, -SO_2-, -R_3-,$ $-O-R_3-$, and $-O-R_3-O-$, and $R_3$ is a saturated aliphatic hydrocarbon having from one to about six carbon atoms.

16. A composition as in claim 6 in which the polyimide is present in an amount of at least 5 percent based upon the combined weight of polyimide and tetrafluoroethylene polymer.

17. A composition as in claim 15 in which the polyimide is present in an amount of at least about 10 percent by weight based upon the combined weight of polyimide and tetrafluoroethylene polymer.

18. A composition as in claim 15 containing 20 percent by weight of polyimide and 80 percent by weight of tetrafluoroethylene polymer.

19. The composition of claim 6 in the form of a bearing.

20. A composition as in claim 8 containing a continuous phase of polytetrafluoroethylene and a discontinuous phase comprising the polyimide produced by reacting pyromellitic acid or the anhydride thereof with a diamine.

21. A composition as in claim 20 wherein the diamine is tetramethylene diamine.

22. A composition as in claim 20 containing a continuous phase of polytetrafluoroethylene and a discontinuous phase comprising the polyimide produced by reacting benzophenone tetracarboxylic acid or the anhydride thereof with a diamine.

23. A composition as in claim 22 wherein the diamine is oxydianiline.

* * * * *